United States Patent
Jo et al.

(10) Patent No.: US 11,438,430 B2
(45) Date of Patent: Sep. 6, 2022

(54) ELECTRONIC DEVICE AND METHOD FOR CONTROLLING SAME

(71) Applicant: SAMSUNG ELECTRONICS CO., LTD., Suwon-si (KR)

(72) Inventors: Kunhee Jo, Suwon-si (KR); Kiyoung Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/285,029

(22) PCT Filed: Dec. 6, 2019

(86) PCT No.: PCT/KR2019/017230
§ 371 (c)(1),
(2) Date: Apr. 13, 2021

(87) PCT Pub. No.: WO2020/122512
PCT Pub. Date: Jun. 18, 2020

(65) Prior Publication Data
US 2021/0344764 A1    Nov. 4, 2021

(30) Foreign Application Priority Data
Dec. 11, 2018    (KR) .................. 10-2018-0158940

(51) Int. Cl.
*H04L 29/08*    (2006.01)
*H04L 67/50*    (2022.01)
(Continued)

(52) U.S. Cl.
CPC .......... *H04L 67/22* (2013.01); *H04L 67/306* (2013.01); *H04N 21/2407* (2013.01); *H04N 21/25891* (2013.01); *H04N 21/4532* (2013.01)

(58) Field of Classification Search
CPC ... H04L 67/22; H04L 67/306; H04N 21/2407; H04N 21/25891; H04N 21/4532; G06F 17/18; G06F 16/285
See application file for complete search history.

(56) References Cited

U.S. PATENT DOCUMENTS

2005/0144499 A1* 6/2005 Narahara .......... H04N 21/4828
714/1
2015/0370814 A1* 12/2015 Liodden ............. G06Q 30/0201
707/738

(Continued)

FOREIGN PATENT DOCUMENTS

EP    1 933 530 A2    6/2008
EP    2 706 765 A1    3/2014
(Continued)

OTHER PUBLICATIONS

International Search Report dated Apr. 3, 2020 issued by the International Searching Authority in International Application No. PCT/KR2019/017230 (PCT/ISA/210).
(Continued)

*Primary Examiner* — Jungwon Chang
(74) *Attorney, Agent, or Firm* — Sughrue Mion, PLLC

(57) ABSTRACT

An electronic apparatus is configured to: obtain through the communicator characteristic data of each of the external apparatuses regarding a plurality of user characteristics, classify the plurality of external apparatuses into a plurality of groups, whose user characteristic are similar, based on the obtained characteristic data, in response to designating one or more first external apparatuses among the plurality of external apparatuses, calculate similarity of the user characteristic between the first external apparatus and a plurality of second external apparatuses of the group in which the first external apparatus is included among the plurality of groups,
(Continued)

and select one or more second external apparatuses whose similarity are relatively high among the plurality of second external apparatuses.

14 Claims, 9 Drawing Sheets

(51) Int. Cl.
  *H04L 67/306* (2022.01)
  *H04N 21/24* (2011.01)
  *H04N 21/258* (2011.01)
  *H04N 21/45* (2011.01)

(56) References Cited

U.S. PATENT DOCUMENTS

| 2016/0026669 | A1 | 1/2016 | Honda et al. |
| 2017/0142465 | A1* | 5/2017 | Ray ................... H04N 21/2668 |
| 2017/0206276 | A1* | 7/2017 | Gill ................... G06F 16/285 |
| 2018/0139296 | A1* | 5/2018 | Yeh ................... H04L 67/22 |
| 2020/0394540 | A1* | 12/2020 | Ochiai ................ G06F 16/00 |

FOREIGN PATENT DOCUMENTS

| JP | 2012-173818 A | 9/2012 |
| JP | 2013-206409 A | 10/2013 |
| JP | 2013-218415 A | 10/2013 |
| JP | 2016-24739 A | 2/2016 |
| KR | 10-0429792 B1 | 5/2004 |
| KR | 10-2013-0020050 A | 2/2013 |
| KR | 10-1276314 B1 | 6/2013 |
| KR | 10-2014-0090296 A | 7/2014 |

OTHER PUBLICATIONS

Communication dated Aug. 23, 2021, issued by the European Patent Office in European Application No. 19896847.1.
Communication dated Jul. 19, 2022, issued by the European Patent Office in European Application No. 19896847.1.

* cited by examiner

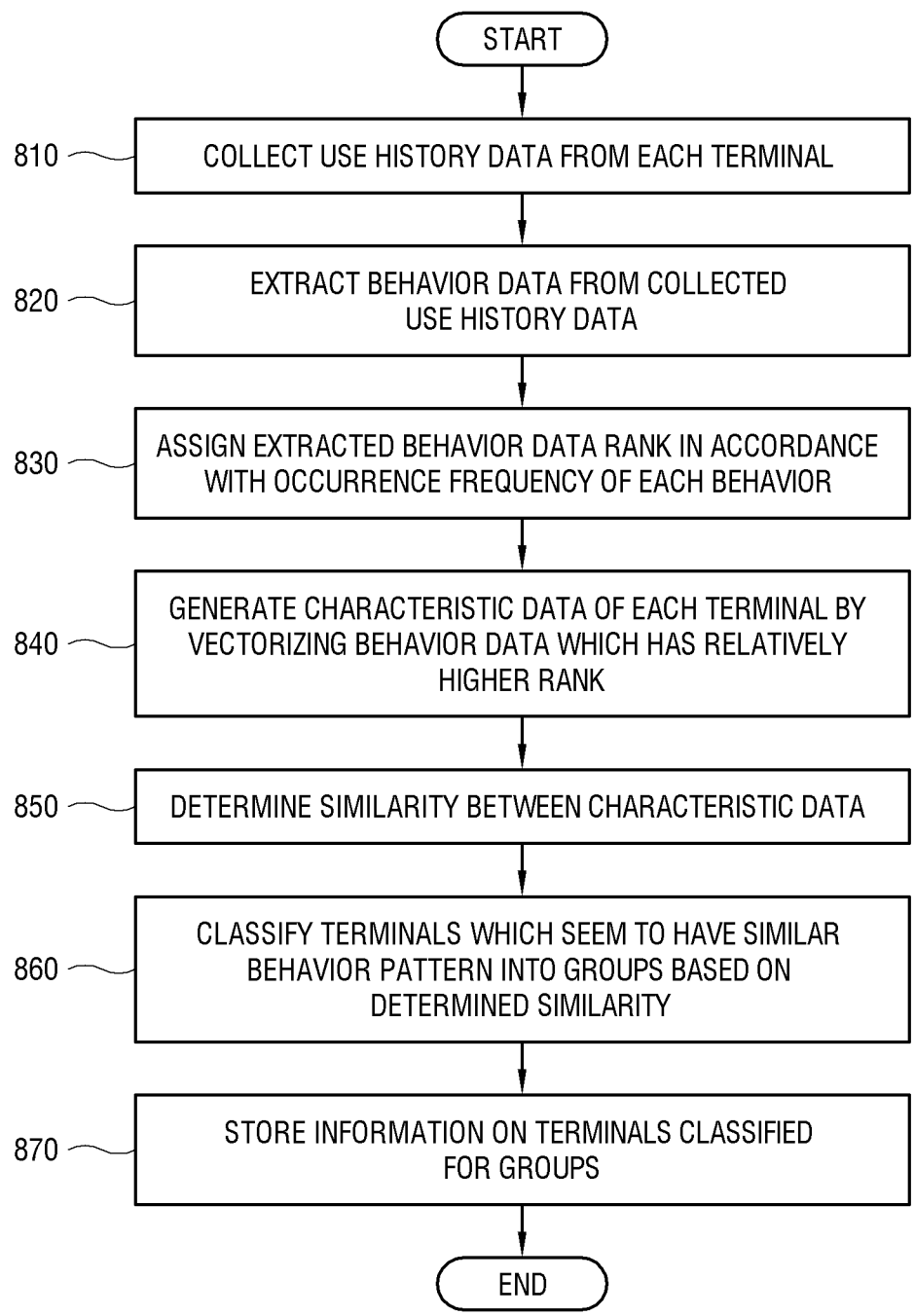

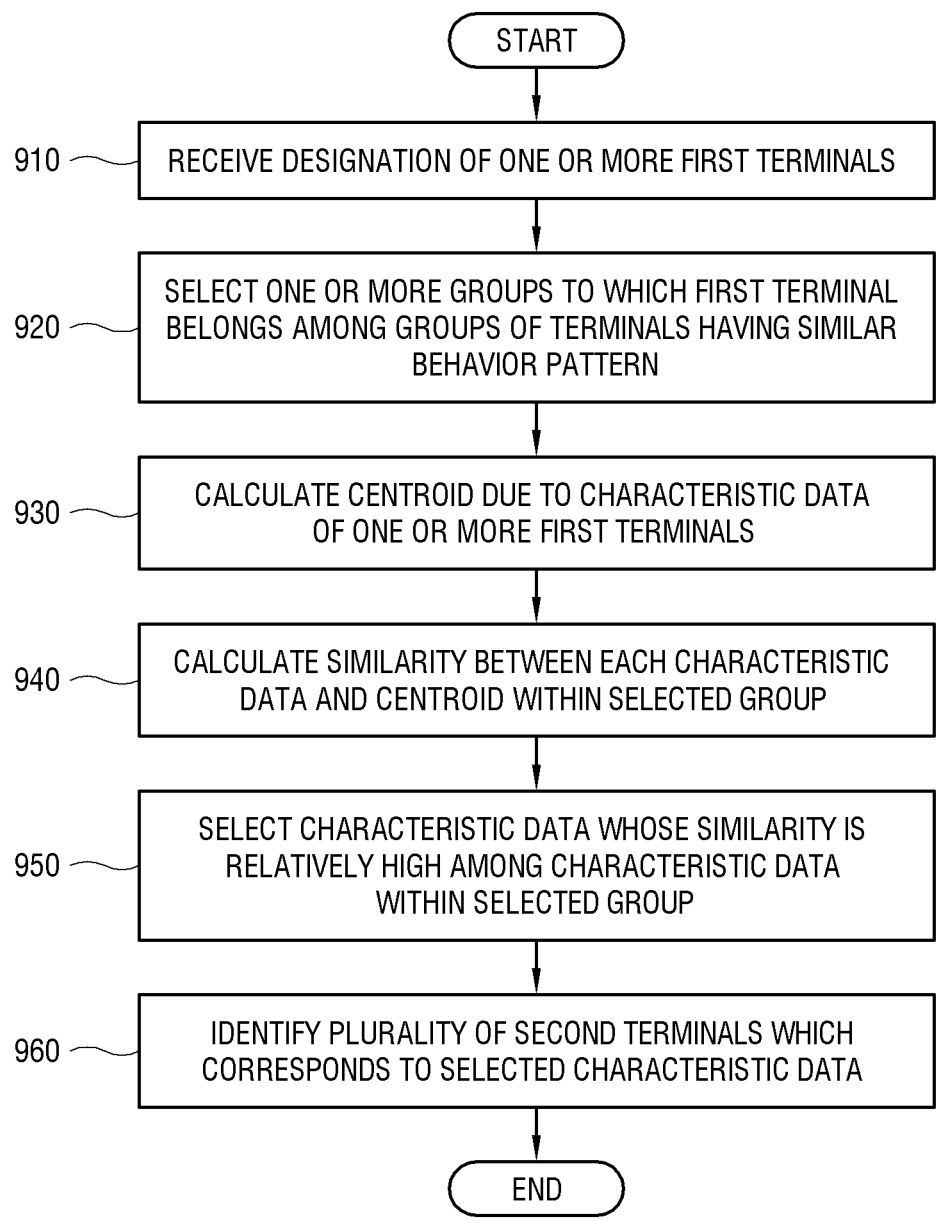

ELECTRONIC DEVICE AND METHOD FOR CONTROLLING SAME

TECHNICAL FIELD

The disclosure relates to an electronic apparatus and a control method thereof to manage data regarding a number of external apparatuses and provide a preset service to each external apparatus, more specifically, an electronic apparatus and a control method thereof to identify the external apparatuses of users who have certain tendencies in providing a customized service suitable for the users of the various external apparatuses.

BACKGROUND ART

An electronic apparatus which basically includes electronic components such as a central processing unit (CPU), a chipset, a memory, and the like to compute and process certain information in accordance with certain processes may be variously classified in accordance with information to be processed and what it is used for. For example, the electronic apparatus is classified into an information processing apparatus such as a personal computer (PC), a server or the like for processing general information, an image processing apparatus for processing image data; an audio apparatus for audio process, home appliances for miscellaneous household chores, etc. The image processing apparatus may be actualized by a display apparatus that displays processed image data as an image on a display panel provided therein. Such electronic apparatuses of various types may perform a role of a server and a client which are communicate with each other.

The electronic apparatus operating as the server communicates through a network with a number of external apparatuses which operate as the client. The server may provide various services to the external apparatuses using a one-to-multi communication network. For an example of providing the service, the server may use a passive way to display a webpage guides information on the plurality of services and, when the client connecting to the webpage selects a service to be desired, transmit content data of the selected service to the client. Alternatively, the server may use an active way to determine the tendency of each client individually, and provide or guide the client with the service prepared for the determined tendency.

The active way described above is used for a customized commodity recommendation system. The system is to construct a service such as products or goods suitable for a certain user. However, the number of the clients which are managed by the server is so large as tens or hundreds that it is not easy to identify the client which has a certain tendency among the lots of clients. For example, when information on a few clients having a common tendency is input from a manager, the server compares data regarding the tendency that is represented by the input information with data of each client managed by the server one to one. However, if the data of the client managed by the server becomes enormously big data, such a comparison method is a great burden for the server and also causes much delay in time.

Therefore, when the server provides the service corresponding to a certain tendency, there may be needed a method of identifying relatively fast and easily the clients having the tendency or having a characteristic similar to the tendency.

Technical Solution

According to an embodiment of the disclosure, there is provided an electronic apparatus including: a communicator configured to communicate with a plurality of external apparatuses; and a processor configured to: obtain through the communicator characteristic data of each of the external apparatuses regarding a plurality of user characteristics, classify the plurality of external apparatuses into a plurality of groups, whose user characteristic are similar, based on the obtained characteristic data, in response to designating one or more first external apparatuses among the plurality of external apparatuses, calculate similarity of the user characteristic between the first external apparatus and a plurality of second external apparatuses of the group in which the first external apparatus is included among the plurality of groups, and select one or more second external apparatuses whose similarity are relatively high among the plurality of second external apparatuses.

Here, the user characteristic may indicate a behavior pattern which is obtained from a use history of a user of the external apparatus.

Also, the characteristic data may include a plurality of unit items regarding a preset plurality of behaviors of the user and an item value which indicates whether the user conducts the behavior.

Here, the processor may be further configured to compare the item values among the plurality of characteristic data at a preset plurality of bit position, and determine whether the user characteristics are similar among the plurality of characteristic data based on a number of bits which indicate a same value.

Also, the processor may be further configured to calculate the similarity of the user characteristic between the first external apparatus and the second external apparatus by obtaining a centroid of the characteristic data of the one or more first external apparatuses and calculating similarity to the centroid for each of the characteristic data of the plurality of second external apparatuses.

Here, the processor may be further configured to calculate a Euclidean distance between the characteristic data of the plurality of second external apparatus and the centroid, and select the second external apparatus whose Euclidean distance is smaller than a threshold as the second external apparatus whose similarity is relatively high.

Also, the centroid may be an average of coordinate values of the characteristic data of the one or more first external apparatuses.

According to an embodiment of the disclosure, there is provided a method of controlling an electronic apparatus, including: obtaining characteristic data of each of external apparatuses regarding a plurality of user characteristics, classifying the plurality of external apparatuses into a plurality of groups, whose user characteristic are similar, based on the obtained characteristic data, in response to designating one or more first external apparatuses among the plurality of external apparatuses, calculating similarity of the user characteristic between the first external apparatus and a plurality of second external apparatuses of the group in which the first external apparatus is included among the plurality of groups, and selecting one or more second external apparatuses whose similarity are relatively high among the plurality of second external apparatuses.

DESCRIPTION OF DRAWINGS

FIG. 8 illustrates a flowchart indicating a method of classifying the terminals into the groups of the similar user characteristics based on use history data which is collected from each terminal by the server according to an embodiment of the disclosure.

FIG. 9 illustrates a flowchart indicating the method that the server according to an embodiment of the disclosure identifies one or more first terminals designated from outside and a second terminal having the similar behavior pattern.

BEST MODE

Figure 1:
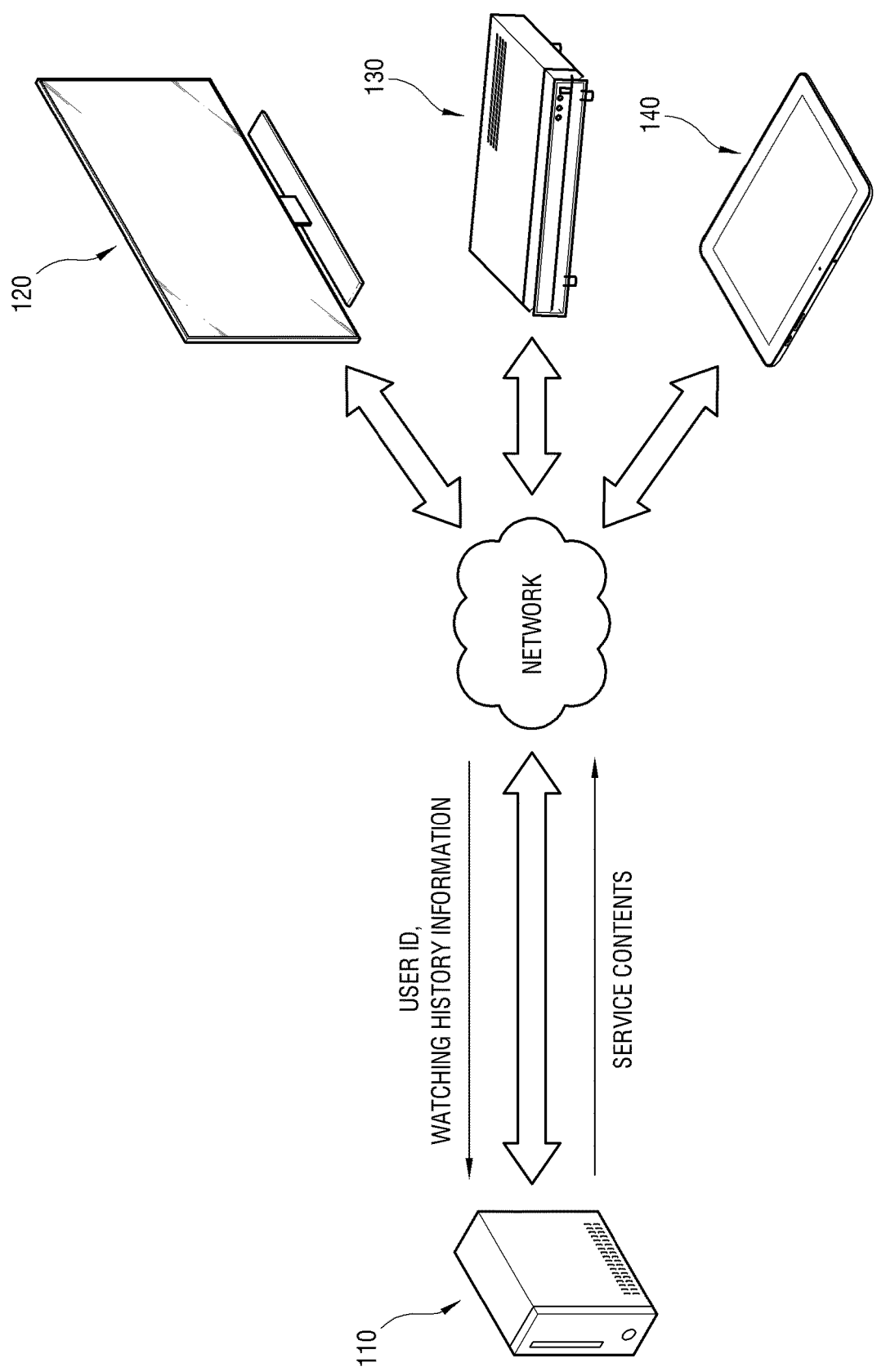
FIG. 1 illustrates an electronic apparatus according to an embodiment of the disclosure.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments.

In the following embodiments, terms 'first', 'second', etc. are used only to distinguish one element from another, and singular forms are intended to include plural forms unless otherwise mentioned contextually. The terms used in the embodiments will be applied to describe the embodiments and do not limit the disclosure.

In addition, in embodiments of the disclosure, at least one of the plurality of elements refers to not only all of the plurality of elements, but also each one or all combinations thereof excluding the rest of the plurality of elements.

FIG. 1 illustrates an electronic apparatus according to an embodiment of the disclosure.

As illustrated in FIG. 1, the electronic apparatus according to an embodiment of the disclosure is embodied as a server 110 and is connected to a plurality of clients or terminals 120, 130 and 140 to communicate with through a network. However, the electronic apparatus embodied as the server 110 is merely an example, and may be embodied as a host apparatus connected to various types of the terminals 120, 130 and 140 to respectively communicate with. The method of connection between the server 110 and the terminals 120, 130 and 140 is various as a wide area network, a local area network, one-to-multi connection by a cable, etc. The terminal 120, 130 and 140 may be embodied as various types of devices such as a television, a computer, a set-top box, a tablet, a portable media player, a wearable device, a home appliance, etc. The server 110 is illustrated to be connected to three of the terminals 120, 130 and 140 in an embodiment, but a number of the terminals 120, 130 and 140 substantially connected to the server 110 to communicate with is not limited thereto.

One server 110 performing related operations is described, but is merely an example, where an embodiment may also be applied to a plurality of servers 110 operating with links. In this case, the plurality of server 110 may share the related operations.

The server 110 is provided to identify the connected plurality of terminals 120, 130 and 140. As a method of identifying the terminals 120, 130 and 140, the server 110 may identify through an apparatus identification (ID) of each of the terminals 120, 130 and 140 or a user ID who uses each terminal 120, 130 or 140. The ID of the terminals 120, 130 and 140 may be transmitted from the terminals 120, 130 and 140 to the server 110 or be arbitrarily assigned by the server 110 to the connected terminals 120, 130 and 140. Below in an embodiment, the server 110 will be described to discriminate each of the terminals 120, 130 and 140 in accordance with the user ID.

The server 110 stores use history information of each of the terminals 120, 130 and 140 as well as managing the user ID of the terminals 120, 130 and 140. For example, the server 110 collects history information, where a user watches various contents, from each of the terminals 120, 130 and 140, and obtains information on a watching pattern or behavior pattern of the user based on the collected history information. The server 110 stores the obtained information to correspond to the user ID as characteristic data which indicates the behavior pattern of the user.

The server 110 may provide a service which is preset individually to the terminals 120, 130 and 140. Such service is variously provided in accordance with a content embodied in the server 110, where, as an example of an embodiment, a case in which an advertisement on a product is provided to the terminals 120, 130 and 140 will be described. An embodiment may also be applied to another case in which a content other than the advertisement is provided as the service.

The server 110 may provide an advertisement of a certain product commonly to all of the terminals 120, 130 and 140. However, because the tendencies and preferences of users are not the same from each other, the advertisement may be useful for a user who prefers to the product but may be unnecessary for a user who does not prefer to the product. That is, the server 110 selects users who prefer to the product in big data of the users managed by the server 110 and provides an advertisement which is customized for the selected users.

Here, for an example of an advertisement of a "baseball computer game", the advertisement is easily expected to be useful for a user who has a tendency to like the "baseball computer game". However, the advertisement may be effective for a user who has a tendency to like "baseball", a user who has a tendency to like a "computer game", and further a user who has a tendency to like general recreation, as well as the user who has the tendency to like the "baseball computer game". In this view, when the user who has the tendency to like the "baseball computer game" which is a main object of the advertisement is determined, it is preferable to provide the advertisement by selecting users whose tendencies are similar to that of the user.

Therefore, when first determining the user or the terminals 120, 130 and 140 to have the tendency for which the service to be provided is useful, the server 110 according to an embodiment of the disclosure then selects other users or terminals 120, 130 and 140 having the tendencies similar to that of the determined user or terminals 120, 130 and 140.

The server 110 provides the service to the selected users or terminals 120, 130 and 140. Accordingly, in providing the service corresponding to a certain tendency, the server 110 can fast and easily identify the users who have the tendency or whose characteristics are similar to the tendency.

Below, hardware configurations consisting the server 110 will be described.

Figure 2:
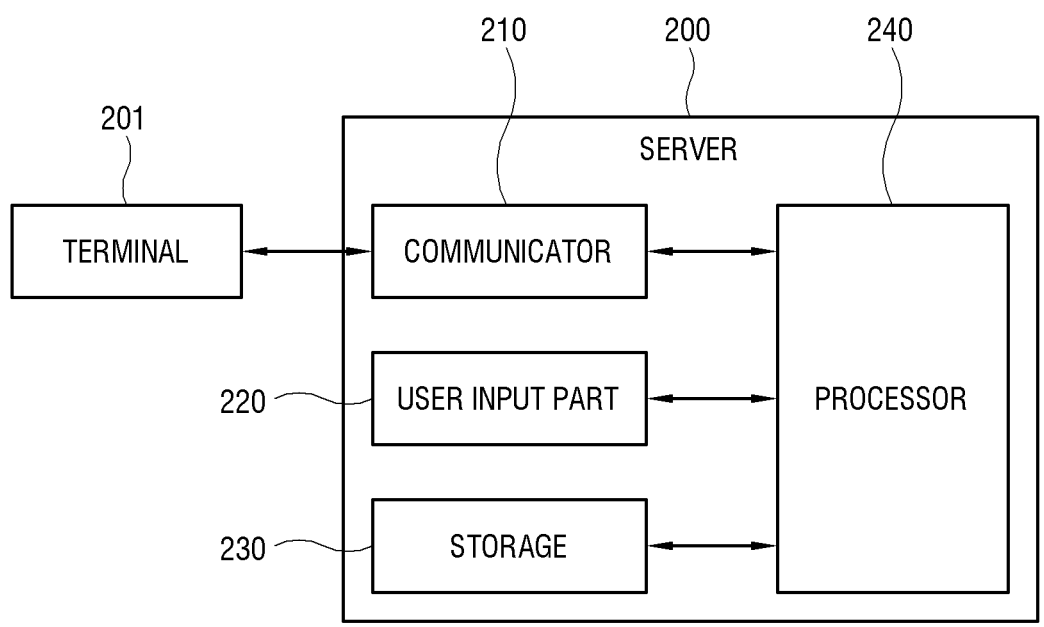
FIG. 2 is a block diagram illustrating the configurations of the server according to an embodiment of the disclosure.

FIG. 2 is a block diagram illustrating the configurations of the server according to an embodiment of the disclosure.

As illustrated in FIG. 2, the server 200 includes a communicator 210 to communicate with the plurality of terminals 201, a user input part 220 for a user input, a storage 230 to store data, and a processor 240 to process data.

The communicator 210 is bi-directional communication circuitry which includes at least one of configurations such as communication modules, communication chips, etc. corresponding to various types of wired and wireless communication protocols. For example, the communicator 210 may be embodied as a wireless communication module which performs a wireless communication with an access point in accordance with a Wi-Fi protocol, or a LAN card which is connected in a wired manner to a router or gateway. For example, the communicator 120 may transmit or receive data packets to or from the terminals 201 by communicating with the terminals 201 through a network.

The user input part 220 includes various types of input interfaces which are provided for a user input. The user input part 220 may be configured in various types according to manipulation ways of users, for example, a button part, provided at the server 200, a keyboard, a mouse, a touchpad, a touchscreen, a remote controller, etc.

The storage 230 is accessed by the processor 240, where read, write, correct, delete, renew, etc. of data is performed in accordance with the control of the processor 240. The storage 230 includes a non-volatile memory such as a flash-memory, a hard disc drive, a solid-state drive, etc. capable of storing data regardless of power to be supplied, and a volatile memory such as a buffer, a random access memory, etc. to load data to be processed.

The storage 230 according to an embodiment of the disclosure stores the plurality of user ID to identify the users of the plurality of terminals 201, big data on characteristic data regarding the user characteristics of the user IDs, and contents of various services to be provided to the terminals 201. The characteristic data will be described later. According to design, the contents of the services may be stored in an additional external apparatus which is able to be connected by the server 200.

The processor 240 includes one or more hardware processors which are embodied as a CPU, a chipset, a buffer, circuitry, etc. which are mounted at a printed circuit board, and, according to design, may be embodied as a system on chip (SOC). The processor 240 identifies the connected plurality of terminals 201 according to the user IDs, when determining a service to be provided, select the user IDs among the big data to which the service is provided, and provides the service to the terminals 201 of the selected user IDs.

Below, operations of the processor 240 according to an embodiment of the disclosure will be described.

Figure 3:
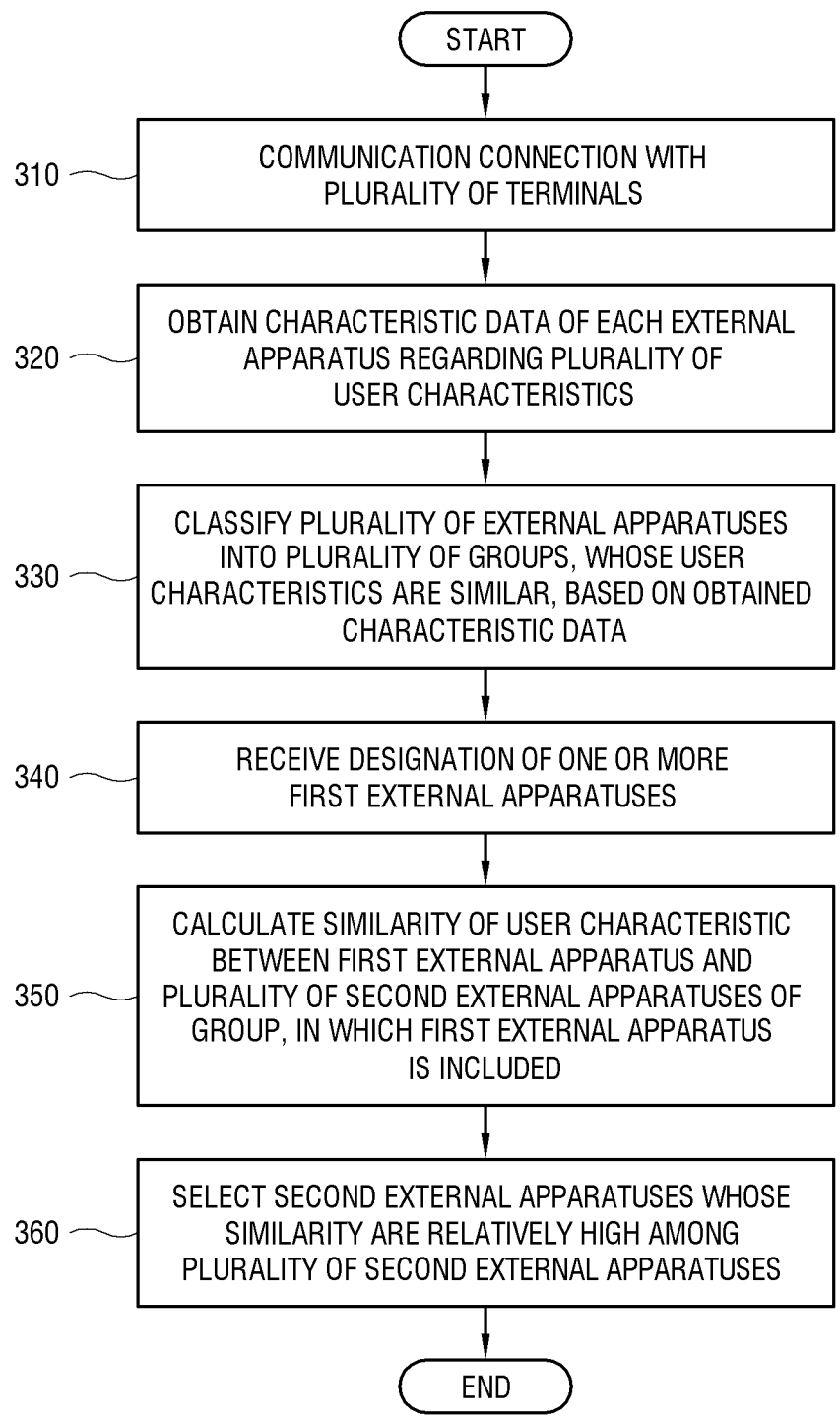
FIG. 3 is a flowchart illustrating a control method of the server according to an embodiment of the disclosure.

FIG. 3 is a flowchart illustrating a control method of the server according to an embodiment of the disclosure.

As illustrated in FIG. 3, the following operations performed by the processor of the server.

At operation 310, the server connects to the plurality of terminals to communicate with.

At operation 320, the server obtains characteristic data of each external apparatus regarding a plurality of user characteristics. Each external apparatus is discriminated by a user ID, the characteristic data regarding the user characteristic is information which indicates characteristic about a behavior pattern of user that is collected from the external apparatus.

At operation 330, the server classifies plurality of external apparatuses into a plurality of groups, whose user characteristics are similar, based on the obtained characteristic data. That is, the server classifies the user IDs, whose behavior patterns are determined to be similar, into group units. The terminals of the user IDs which belong to one group have users whose behavior patterns are similar.

At operation 340, the server receives designation of one or more first external apparatuses among the plurality of external apparatuses. Here, the designation of first external apparatuses may be input by a manager of the server or be received from an additional external apparatus or another server which communicate with the server.

At operation 350, the server calculates similarity of the user characteristic between the first external apparatus and a plurality of second external apparatuses of a group, in which the first external apparatus is included, among the plurality of groups. That is, the server excludes a group in which the user ID of the first external apparatus is not included and selects a group in which the user ID of the first external apparatus is included. The server respectively calculates the similarity which indicates how similar the behavior pattern of each of plurality of user IDs belonging to the selected group is to that of the user ID of the first external apparatus.

At operation 360, the server selects one or more second external apparatuses whose similarity are relatively high among the plurality of second external apparatuses.

Accordingly, the server is able to easily select the second external apparatus whose user characteristic is similar to that of the first external apparatus among the big data and provide a service corresponding to the user characteristic of the first external apparatus to the first external apparatus and the second external apparatus.

Below, each of the operations of the server will be described in more detail.

Figure 4:
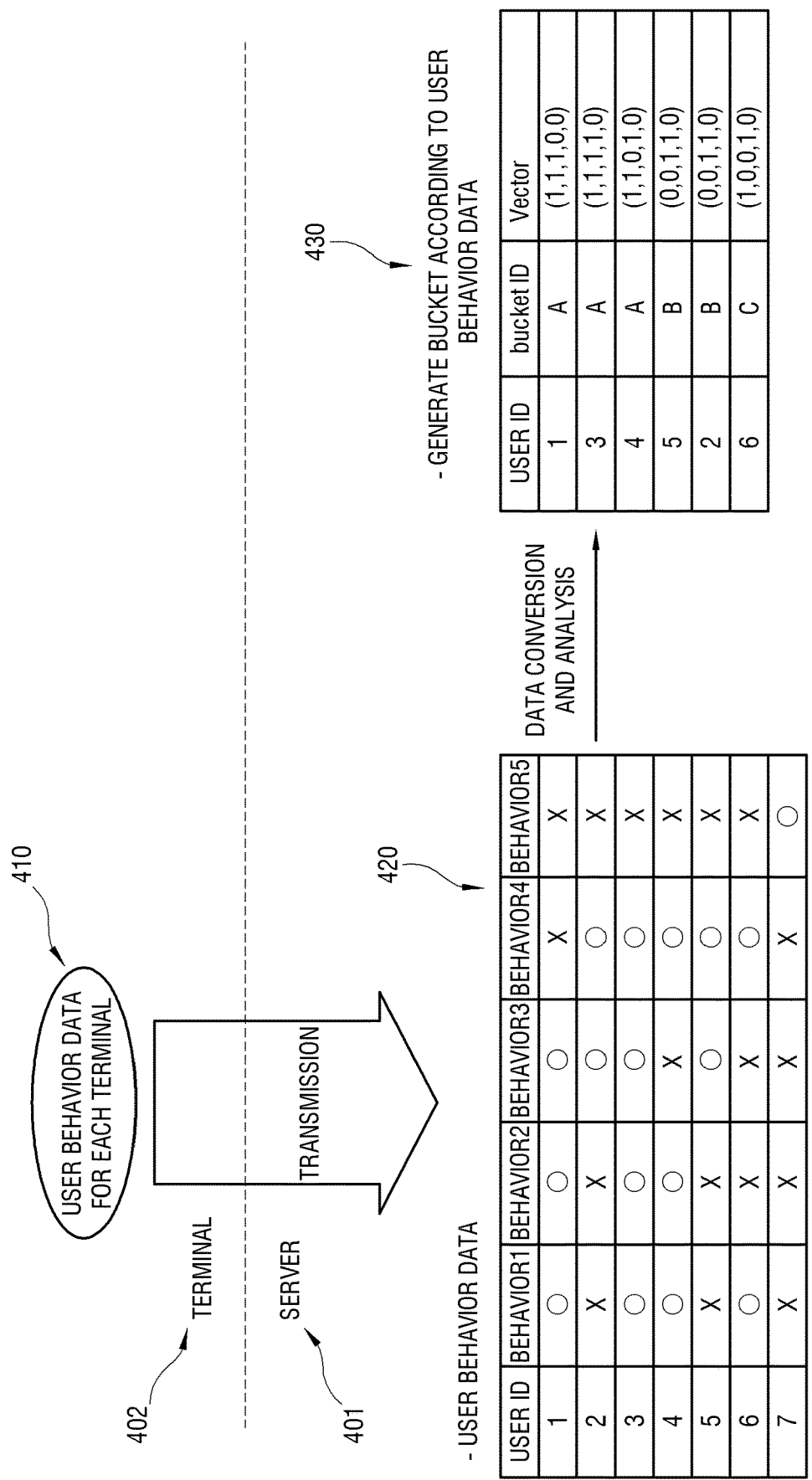
FIG. 4 illustrates an example of behavior data of users collected by the server according to an embodiment of the disclosure from each terminal and a classification method obtained from the behavior data.

FIG. 4 illustrates an example of behavior data of users collected by the server according to an embodiment of the disclosure from each terminal and a classification method obtained from the behavior data.

As illustrated in FIG. 4, the server 401 obtains behavior data 410 of users of the plurality of terminals 402 from the terminals 402. The behavior data 410 of users is about user's watching history of various contents and indicates various behavior patterns of users relating to the contents. For example, the various behavior of users includes widely ranged items such as a watching pattern and preference for each genre or type of the contents, preference to various channels of broadcast programs, a connection pattern of various websites, watching time of the contents, selection of advertisements regarding a certain type of goods, re-selection of video-on-demand contents, execution of certain applications, etc.

The obtained behavior data 410 of users may be arranged as a table 420 which corresponds to the user IDs. The table 420 is provided to describe clearly and briefly an embodiment of the disclosure, and is not necessarily prepared by the server 401.

The behaviors of user may be arranged as a plurality of unit behaviors. For example, the unit behavior reflects various behavior patterns to be conducted by the users in association with the contents such as behavior 1 of 'more than three hours a week of watching time for a broadcast program of news genre', behavior 2 of 'more than five hours a week of watching time for a certain channel of broadcast program', behavior 3 of 'more than ten times of clicks in ten days for clothes advertisement in the Internet', behavior 4 of 'more than five times of searches in ten days for movie-related keywords using an Internet search engine', behavior 5 of 'watching streaming of a certain drama in a week at a VOD providing site', etc. What is about a user's conduct of the unit behavior as described above is referred to as a parameter of the unit behavior. The parameter of the unit behavior has a behavior value which indicates whether the user conducts the behavior corresponding to the parameter. For example, the behavior value may be "○" if the user conducts the behavior corresponding to the parameter, and be "X" if not.

The server 401 obtains behavior data 420 which is preset for each user ID as indicated in the table 420 based on the obtained behavior data 410 of users.

For example, the table 420 indicates IDs of a plurality of users and a behavior value of parameter of the plurality of preset unit behaviors for each user. For example, as the behavior data of a user whose user ID is 1, the behavior values indicate "○" for behavior 1, behavior 2 and behavior 3, whereas the behavior values indicate "X" for behavior 4 and behavior 5. As the behavior data of a user whose user ID is 7, the behavior values indicate "X" for behavior 1, behavior 2, behavior 3 and behavior 4, whereas the behavior value indicates "○" for behavior 5.

The server 401 converts and analyzes the behavior data of the table 420 and classifies the user IDs into a plurality of groups which indicate similar user characteristics, that is, similar behavior patterns. Such classification result may be represented as a table 430.

In order for classification of groups as the table 430, the server 401 first vectorizes the behavior data for each user ID of the table 420 and converts into characteristic data. For example, the behavior data of the user ID 2 has the behavior values of "X", "X", "○", "○" and "X" for behavior 1 through behavior 5, respectively. The server 401 converts such behavior values into the characteristic data of the user ID 2 to obtain vector values according to behavior order by applying 1 to the behavior value of "○", and applying 0 to the behavior value of "X". According to this, the characteristic data of user ID 2 is (0,0,1,1,0).

When the characteristic data for all user IDs is obtained, the server 401 groups the user IDs whose user characteristics have similar characteristic data. Such described process conforms to a method based on a principle of locality sensitive hashing (LSH) algorithm. The LSH algorithm is a dimensional reduction methodology based on dimensional probability of high dimensional data to determine similarity by reducing dimensions of the high dimensional data and comparing each other. For example, supposing that a document consists of one hundred words, the document is vectorized as one hundred dimensions, where a technique to reducing the one hundred-dimensional vector to n dimensions of a limited size is the LSH algorithm.

As indicated in the table 430, the user IDs have the characteristic data of similar user characteristics are classified into a group. Although the group is represented as a bucket in an embodiment, which does not limit the disclosure. The user IDs 1, 3 and 4 of the similar user characteristics belong to a group of bucket ID A. The user IDs belonging to a same bucket ID indicate a behavior pattern of the similar user characteristics.

Below, a method that the server 401 determines the similarity between the characteristic data will be described.

Figure 5:
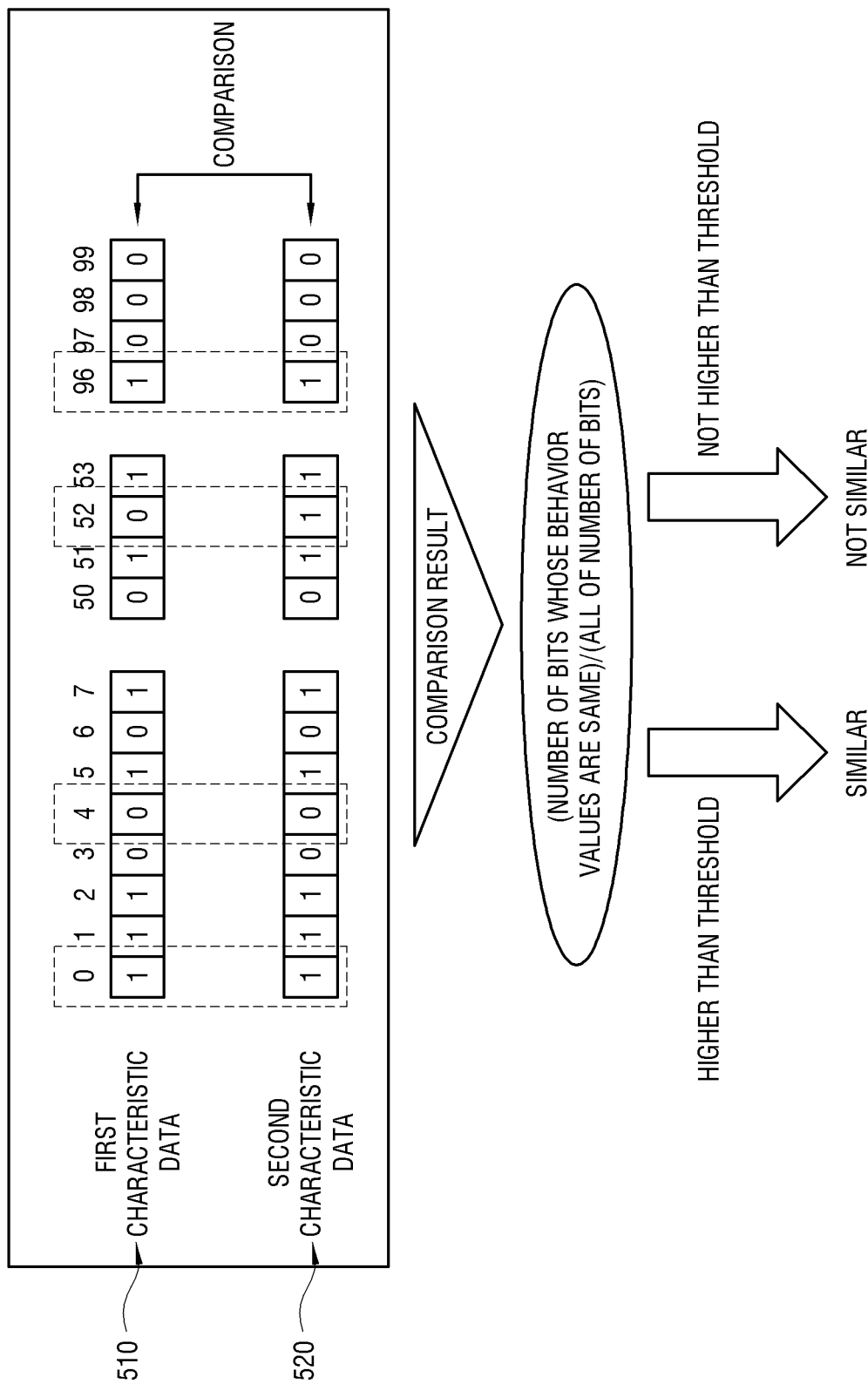
FIG. 5 illustrates a principle that the server according to an embodiment of the disclosure determines the similarity between two characteristic data.

FIG. 5 illustrates a principle that the server according to an embodiment of the disclosure determines the similarity between two characteristic data.

As illustrated in FIG. 5, for first characteristic data 510 and second characteristic data 520, the server determines the similarity between the two by comparing binary codes thereof. Here, because system load and required time are large where the server compares all of the binary codes of the first characteristic data 510 and the second characteristic data 520, the similarity is determined according to the following method.

As described in the above embodiment, since the characteristic data for each user ID is generated from a same number of behavior parameters, the characteristic data for each user ID has a same data length. The server compares the behavior values at a same bit position of the first characteristic data 510 and the second characteristic data 520 and determines the similarity from each other according to what a rate of a same number of bits is.

Here, the bit position for comparison may be selected among all bits periodically or randomly. However, the comparison of behavior values is performed at the same bit position of the first characteristic data 510 and the second characteristic data 520.

For example, the server selects a plurality of bit positions as a start of a bit position 0 by a four-bit interval among a total of 100 bits. Bit positions 0, 4, 52 and which are part of the selected bit positions are illustrated in FIG. 5. The server compares the behavior values of the first characteristic data 510 and the second characteristic data 520 for each selected bit. The behavior values of the first characteristic data 510 and the second characteristic data 520 are same at the bit positions 0, 4, and 96. On the other hand, the behavior value of the first characteristic data 510 is 0, which is different from the behavior value of the second characteristic data 520 being 1.

In this way, the server calculates the rate of the number of bits, whose behavior values of the first characteristic data 510 and the second characteristic data 520 are same, to all of the number of selected bits. The server determines that the first characteristic data 510 and the second characteristic data 520 are similar when the calculated rate is higher than a preset threshold, and that the first characteristic data 510 and the second characteristic data 520 are not similar when the calculated rate is not higher than the preset threshold.

The server processes the characteristic data for all user IDs to group the user IDs which have the similar user characteristics like the above embodiment.

In these configurations, a method of identifying a designated terminal and other terminals having the similar user characteristics when at least one terminal is designated will be described below.

Figure 6:
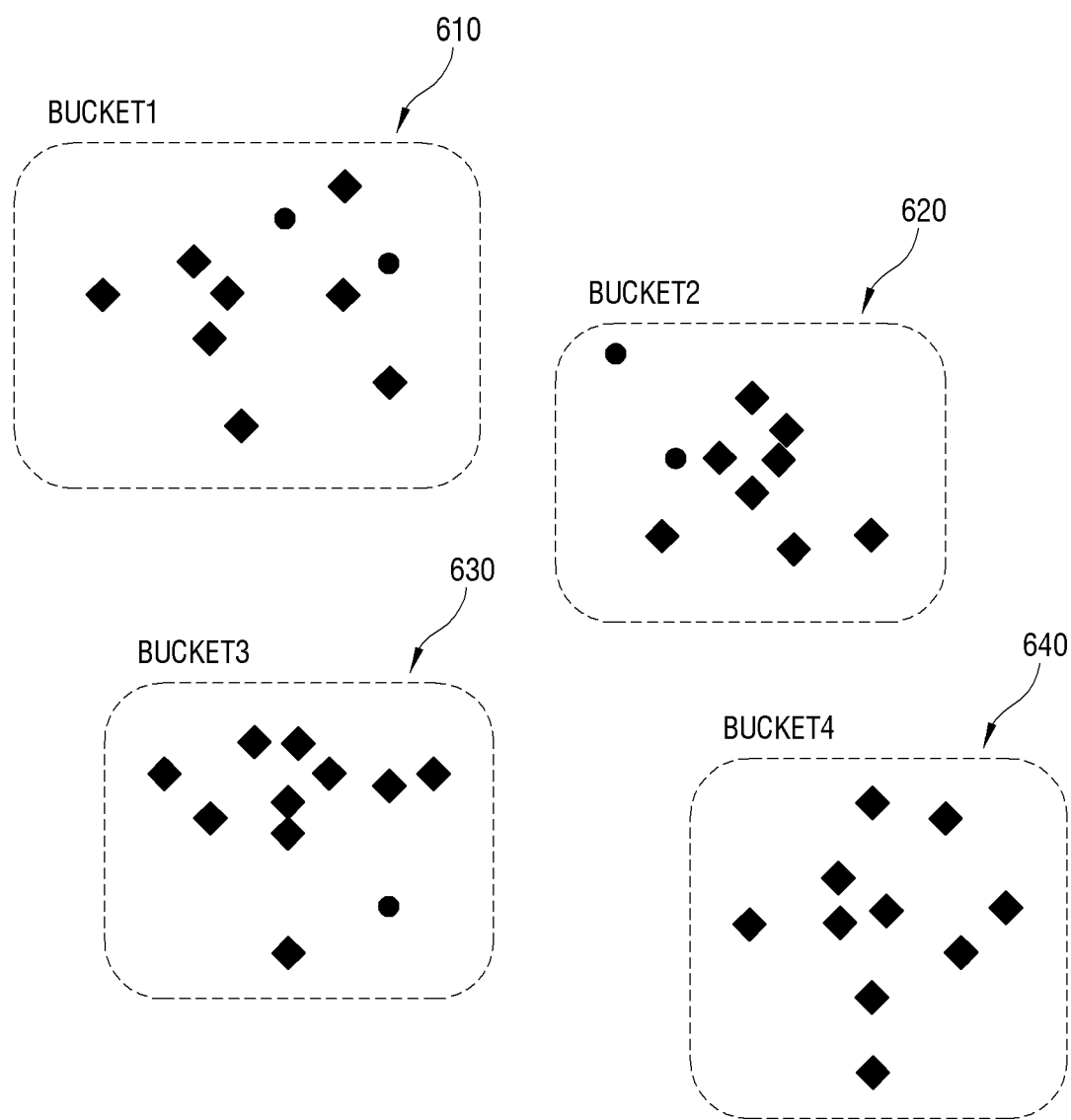
FIG. 6 illustrates an example indicating that the characteristic data which is referred to by the server according to an embodiment of the disclosure is disposed on a Euclidean plane.

FIG. 6 illustrates an example indicating that the characteristic data which is referred to by the server according to an embodiment of the disclosure is disposed on a Euclidean plane.

As illustrated in FIG. 6, the characteristic data for each of the plurality of user IDs is displayed on the Euclidean plane. Each dot illustrated in the figure is the characteristic data for each of the user IDs to be shown on the Euclidean plane because the characteristic data is represented as an n-dimensional vector value. Also, as described above, the plurality of characteristic data having the similar user characteristics is grouped, where the similar characteristic data is disposed to be close to each other.

The dots disposed close to each other may be bound in an area within a boundary, which indicates the group having the similar user characteristics. Supposing there are four groups of bucket 1 610, bucket 2 620, bucket 3 630 and bucket 4 640, the users who correspond to the dots in bucket 1 610 have the similar user characteristics. Similarly, the users who correspond to the dots in bucket 1 610 have different user characteristics from the users who correspond to the dots in bucket 2 620. However, the expression used in the disclosure that the user characteristics are similar or different is merely for the sake of description. As described above, because the user characteristics include various behaviors, the user characteristics of two users are similar but may indicate to be different from each other on a certain behavior, whereas the user characteristics of two users are different but may indicate to be similar from each other on a certain behavior.

The server receives designation of the user ID which has a user characteristic from outside. For example, a case that an advertiser provides the advertisement of certain goods will be considered. The advertiser may designate one or more users who have a behavior pattern for which the advertisement is useful. However, it is not efficient that the advertiser provides the advertisement to only a few designated users in consideration of advertisement characteristic in which it is advantageous to provide the advertisement to much more people. Also, it is not preferable to provide the advertisement to people who are not expected to have interest in the advertisement. Therefore, it is necessary that the server identifies other users who have the user characteristics similar to the designated users in the big data and provides the advertisement to the identified other users.

Among the dots illustrated in the figure, the characteristic data of the user IDs designated by the server is represented as a circular dot, while other characteristic data is represented as a diamond-shaped dot. The server discriminates, among the groups for each user characteristic, the group which includes the characteristic data of the designated user IDs and the group which does not includes the characteristic data of the designated user IDs. For example, among bucket 1 610, bucket 2 620, bucket 3 630 and bucket 4 640, bucket 1 610, bucket 2 620 and bucket 3 630 include the characteristic data of the designated user IDs, whereas bucket 640 does not include the characteristic data of the designated user IDs.

The server excludes bucket 4 640 which does not include the characteristic data of the designated user IDs and takes bucket 1 610, bucket 2 620 and bucket 3 630 which include the characteristic data of the designated user IDs as objects to be processed.

Also, the server obtains a centroid of the characteristic data of the designated user IDs. The centroid or center of mass represents a center of an area in a plane. The first moment of a cross section about an axis through the centroid is zero. The first moment of a cross section $S_x$, when a cross section and an axis x are given, is a total sum of moments with respect to an overall cross section area of an elemental cross section area dA and a distance y to the axis x. That is, $S_{x0}$ for the axis through the center of the cross section is zero. The centroid is a geometric center within a polygon, where coordinate values of every points included in a given area become an average, and is obtained by a coordinate average of points consisting of the polygon.

In an embodiment, for example, the server may obtain as the centroid a position which is a same distance from dots of the designated characteristic data. In case of two designated dots, the server may obtain as the centroid the position which is the same distance from the two dots on a line connecting the two dots. If the designated characteristic data is only one, the server uses the characteristic data itself because the centroid does not need to be obtained.

There are various methods of selecting an object for which the centroid is to be obtained among the characteristic data of the plurality of designated user IDs. For example, the sever may obtain a single centroid due to all designated characteristic data. Alternatively, the sever may discriminate the designated characteristic data for each group and obtain the centroid for each group and each piece of the characteristic data.

Below, an operation of obtaining the centroid for each group and each piece of the characteristic data will be described.

Figure 7:
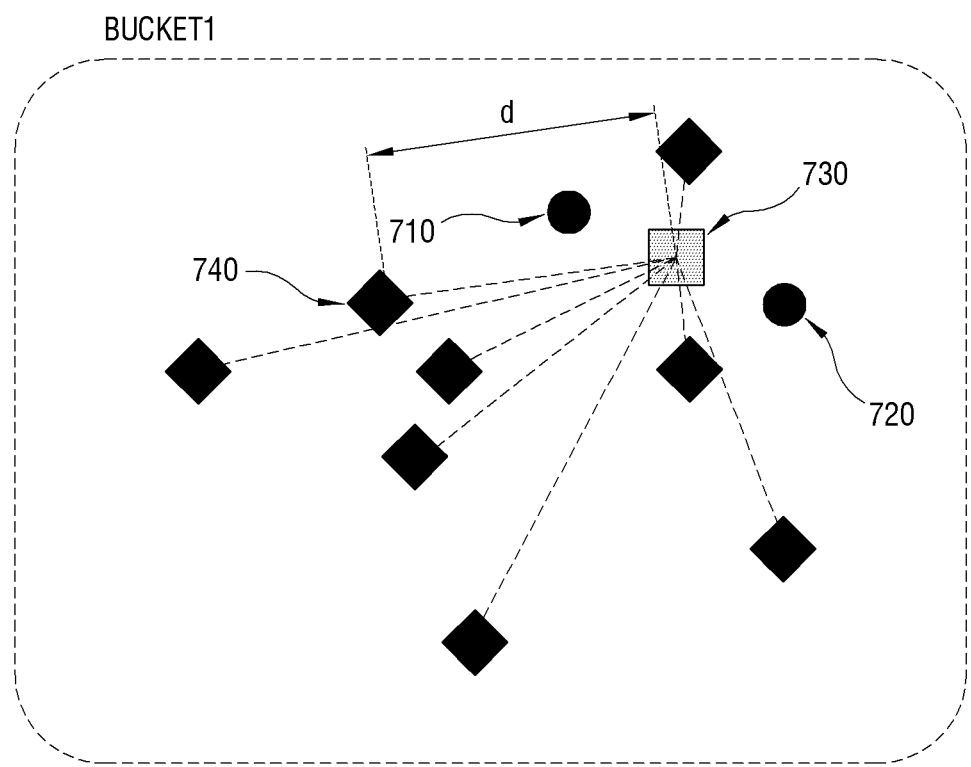
FIG. 7 illustrates an example indicating a method of selecting the characteristic data similar to the designated characteristic data in bucket 1 among the groups illustrated in FIG. 6.

FIG. 7 illustrates an example indicating a method of selecting the characteristic data similar to the designated characteristic data in bucket 1 among the groups illustrated in FIG. 6.

As illustrated in FIG. 7, bucket 1 which is one of the groups including the characteristic data having similar user characteristics may be represented on the Euclidean plane, where the characteristic data included in bucket 1 is represented as dots. Because the position of each piece of the characteristic data relates to the user characteristic indicated by the characteristic data, the distance between two dots is represented visually as the similarity of the user characteristic between the users which correspond to the dots.

Such dots of bucket 1 are divided into dots 710, 720 of the designated characteristic data and dots 740 other characteristic data. The server obtains the centroid 730 due to the dots 710, 720 of the designated characteristic data. The method of obtaining the centroid 730 is as described in the above embodiment.

The server calculates a distance d from the centroid 730 to each dot 740 of bucket 1. Such distance d is referred to as a Euclidean distance. When the distance d is calculated for all dots 740 within bucket 1, the server selects a plurality of dots 740 where the distance d is smaller than a preset threshold, that is, a plurality of dots 740 which is disposed relatively close to the centroid 730. The server identifies a plurality of user IDs which corresponds to the selected plurality of dots 740. The identified plurality of user IDs has the user characteristics similar to the firstly designated one or more user IDs.

Alternatively, the server may select a preset number of dots 740 among the plurality of dots 740 in an order of the distance d being short.

In this way, the server is able to obtain the plurality of user IDs whose user characteristics are similar to the designated one or more user IDs from the big data and provide a service to the terminals of the obtained plurality of user IDs.

Below, operations of the server according to an embodiment of the disclosure will be described.

FIG. 8 illustrates a flowchart indicating a method of classifying the terminals into the groups of the similar user characteristics based on use history data which is collected from each terminal by the server according to an embodiment of the disclosure.

As illustrated in FIG. 8, the following operations are performed by the processor of the server.

At operation 810, the server collects use history data from each terminal.

At operation 820, the server extracts behavior data from the collected use history data.

At operation 830, the server assigns the extracted behavior data a rank in accordance with occurrence frequency of each behavior. That is, the server assigns a score to each of the plurality of behavior data in accordance with how much each behavior is conducted in each terminal.

At operation 840, the server generates the characteristic data of each terminal by vectorizing the behavior data which has the relatively higher rank. The server generates the characteristic data based on the behavior data which is conducted relatively a lot among the extracted behavior data.

At operation 850, the server determines the similarity between the characteristic data based on the LSH algorithm.

At operation 860, the server classifies the terminals which seem to have the similar behavior pattern into the groups based on the determined similarity.

At operation 870, the server stores information on the classified terminals for each group. Such information includes an ID of the terminal, the user ID of the terminal, the characteristic data of the terminal, information of a group to which the terminal belongs, etc.

In this way, the server is able to classify the terminals which seem to have the similar behavior pattern into the groups based on the use history collected from each terminal.

Below, in a circumstance where the terminals are grouped, a method that the server identifies one or more first terminals designated from outside and a second terminal having the similar behavior pattern will be described.

FIG. 9 illustrates a flowchart indicating the method that the server according to an embodiment of the disclosure identifies one or more first terminals designated from outside and a second terminal having the similar behavior pattern.

As illustrated in FIG. 9, the following operations are performed by the processor of the server.

At operation 910, the server receives designation of one or more first terminals from outside.

At operation 920, the server selects one or more groups to which the first terminal belongs among the groups of the terminals having the similar behavior pattern.

At operation 930, the server calculates the centroid due to the characteristic data of the one or more first terminals.

At operation 940, the server calculates the similarity between each characteristic data and the centroid within the selected group. The similarity corresponds to the Euclidean distance between each characteristic data and the centroid.

At operation 950, the server selects the characteristic data whose similarity is relatively high among the characteristic data within the selected group. The shorter the Euclidean distance between each characteristic data and the centroid, the higher the similarity.

At operation 960, the server identifies a plurality of second terminals which corresponds to the selected characteristic data.

In this way, the server is able to provide a customized service for the first terminal to the second terminals as well.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is erasable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

The invention claimed is:

1. An electronic apparatus comprising:
a communicator configured to communicate with a plurality of external apparatuses, wherein the plurality of external apparatuses are used by a plurality of users respectively having a plurality of user characteristics; and
a processor configured to:
obtain, through the communicator, characteristic data regarding user characteristic of each of the plurality of users from the plurality of external apparatuses,
classify the plurality of external apparatuses users into a plurality of groups based on the obtained characteristic data, wherein user characteristics of users in each of the plurality of groups are similar to each other,
receive a designation of one or more user characteristics among the plurality of user characteristics, in response to the designation being received, select a group including one or more first users among the plurality of groups, the one or more first users having the one or more user characteristics,
calculate similarity of the user characteristic between the one or more first users and a plurality of remaining users included in the selected group, and
select one or more external apparatuses used by one or more second users whose similarity is relatively high among the plurality of remaining users.

2. The electronic apparatus according to claim 1, wherein the user characteristic indicates a behavior pattern which is obtained from a use history of a user of an external apparatus among the plurality of external apparatuses.

3. The electronic apparatus according to claim 1, wherein the characteristic data includes a plurality of unit items regarding a preset plurality of behaviors of a user and an item value which indicates whether the user conducts a behavior of the preset plurality of behaviors.

4. The electronic apparatus according to claim 3, wherein the processor is further configured to compare item values among a plurality of characteristic data at a preset plurality of bit position, and determine whether the user characteristics are similar among the plurality of characteristic data based on a number of bits which indicate a same value.

5. The electronic apparatus according to claim 1, wherein the processor is further configured to calculate the similarity of the user characteristic between the one or more first users and the one or more second users by obtaining a centroid of the characteristic data of the one or more first users and calculating similarity to the centroid for each of the characteristic data of the plurality of remaining users.

6. The electronic apparatus according to claim 5, wherein the processor is further configured to calculate a Euclidean distance between the characteristic data of the plurality of remaining users and the centroid, and select one or more second users whose Euclidean distance is smaller than a threshold as the one or more second users whose similarity is relatively high.

7. The electronic apparatus according to claim 5, wherein the centroid is an average of coordinate values of the characteristic data of the one or more first users.

8. A method of controlling an electronic apparatus, comprising:
obtaining characteristic data regarding user characteristic of each of a plurality of users from a plurality of external apparatuses, wherein the plurality of external apparatuses are used by the plurality of users respectively having a plurality of user characteristics,
classifying the plurality of users into a plurality of groups based on the obtained characteristic data, wherein user characteristics of users in each of the plurality of groups are similar to each other,
receiving a designation of one or more user characteristics among the plurality of user characteristics,
in response to the designation being received, selecting a group including one or more first users among the plurality of groups, the one or more first users having the one or more user characteristics,
calculating similarity of the user characteristic between the one or more first users and a plurality of remaining users included in the group, and
selecting one or more external apparatuses used by one or more second users whose similarity is relatively high among the plurality of remaining users.

9. The method according to claim 8, wherein the user characteristic indicates a behavior pattern which is obtained from a use history of a user of an external apparatus among the plurality of external apparatuses.

10. The method according to claim 8, wherein the characteristic data includes a plurality of unit items regarding a preset plurality of behaviors of a user and an item value which indicates whether the user conducts a behavior of the preset plurality of behaviors.

11. The method according to claim 10, comparing item values among a plurality of characteristic data at a preset plurality of bit position, and determining whether the user characteristics are similar among the plurality of characteristic data based on a number of bits which indicate a same value.

12. The method according to claim 8, calculating the similarity of the user characteristic between the one or more first users and the one or more second users by obtaining a centroid of the characteristic data of the one or more first users and calculating similarity to the centroid for each of the characteristic data of the plurality of remaining users.

13. The method according to claim 12, calculating a Euclidean distance between the characteristic data of the plurality of remaining users and the centroid, and selecting one or more second users whose Euclidean distance is smaller than a threshold as the one or more second users whose similarity is relatively high.

14. The method according to claim 12, wherein the centroid is an average of coordinate values of the characteristic data of the one or more first users.

* * * * *